United States Patent [19]

Adams, Jr.

[11] 4,177,051

[45] Dec. 4, 1979

[54] METHOD AND APPARATUS FOR SEPARATION, REFINEMENT, EXTRACTION AND/OR CONCENTRATION BY LIQUATION

[76] Inventor: Clyde M. Adams, Jr., 3509 Biddle St., Cincinnati, Ohio 45220

[21] Appl. No.: 882,256

[22] Filed: Feb. 28, 1978

[51] Int. Cl.² ............................................. B01D 9/04
[52] U.S. Cl. ........................................ 62/532; 62/123; 62/540
[58] Field of Search ................ 62/532, 540, 123, 124; 23/273 F; 75/1 R

[56] References Cited

U.S. PATENT DOCUMENTS

| | | | |
|---|---|---|---|
| 3,093,649 | 6/1963 | Ratje et al. | 62/540 |
| 3,170,779 | 2/1965 | Karnofsky | 62/543 |
| 3,178,900 | 4/1965 | Saunders | 62/540 |
| 3,293,872 | 12/1966 | Rowekamp | 62/532 |
| 3,349,573 | 10/1967 | Rowekamp | 62/532 |

*Primary Examiner*—Norman Yudkoff
*Attorney, Agent, or Firm*—James E. Anderson

[57] ABSTRACT

Method and apparatus for separation of mixtures wherein a mixture is cooled very slowly in a quiescent, nondisturbed condition to produce large dendritic crystals of solidified solvent, then heated very slowly while liquid of high solute concentration is drained from the large interstices between the crystals, the cooling and reheating being effected by slowly conveying containers of mixture through a long heat transfer conduit or tunnel having a central refrigeration zone; parallel trains of containers preferably travel through the conduit in opposite directions. The residence time of the mixture in traveling through the conduit or tunnel will be of the order of many hours or a few days, depending upon many factors, and in a large industrial installation the length of a pass through it will be several hundred feet; such factors are interrelated to the quantity and compositions of mixtures being processed.

4 Claims, 6 Drawing Figures

METHOD AND APPARATUS FOR SEPARATION, REFINEMENT, EXTRACTION AND/OR CONCENTRATION BY LIQUATION

BACKGROUND OF THE INVENTION (1) Field of the Invention

Treatment of impure, mixed or contaminated liquids or fusible solids for any or all of the purposes of extraction of valuable products, removal of pollutants, concentration of wastes, concentration of solutions, and separation of mixtures into valuable portions, utilizing the principle of liquation. Inasmuch as all of the above-stated objectives involve unmixing or separation, they all are intended to be embraced within the term "separation" for purposes of describing the present invention.

(2) Description of the Prior Art

Two primary methods of thermal separation of constituents in aqueous mixtures are (1) by distillation or evaporation, and (2) freezing, or fusion. In the case of desalination, salt can be extracted by reverse osmosis and electrodialysis. Thermal separation by distillation and evaporation inherently are heat (energy) consumptive. The most common method of separation by crystallization involves direct contact between the mixture and recycled hydrocarbon gases, which are vaporized and condensed, respectively, to freeze the water and then melt the ice crystals after removal of the solute. Again, in this approach, the costs of hydrocarbons, energy consumption, capital investment and operating costs are prohibitive in terms of kilowatt-hours per pound of potable water or of water that is acceptable for discharge into waterways under applicable governmental regulations.

While distillation equipment, multiple effect evaporators, vapor compression units and direct contact crystallization may be economically feasible for shipboard use and small land-based waterworks, their energy consumption renders them virtually unsuitable for purposes of fulfilling the enormous daily effluent requirements of large industrial plants or for desalination in large waterworks projects. In the prior art, U.S. Pat. Nos. 3,349,573 and 3,293,872 (Rowekamp) espouse "solar freezing" for desalination of seawater in frigid regions of the world which have long, cold winters, by exposing water in shallow trays to the extreme cold atmosphere and very rapidly forming crystals of pure water, from which brine solution is washed away. While this application of the old principle of "liquation" may be feasible on a small scale in arctic regions, it is of no practical benefit or consolation for very large scale industrial applications in warmer climates. Furthermore, the Rowekamp conception of very rapid freezing, which is the antithesis of this invention, would not produce large dendritic crystals with large interstices for containment of high concentration solute.

In the field of pure metallurgy, the sciences of crystal growth and liquation have been studied for perhaps centuries. Liquation is the method of separation of the components of a mixture which depends upon the differences in their fusibility, the conditions necessary for their separation being produced either as the result of partial fusion of a solid mixture by heating, or partial solidification of a liquid mixture by cooling. For example, bismuth was at one time freed from accompanying vein stuff by heating the crude ore in externally heated sloping tubes, whereby the metal melted and drained away, leaving the gangue behind. In the smelting of some metals of low melting point, like tin, such metal impurities in the ore as iron and copper are reduced and dissolved in the tin to a large extent at the higher smelting temperature, and when tapped and solidified the crude metal thus contains more of these impurities than corresponds to their solubility at the melting point of tin; thus, upon reheating a little above the melting point tin sweats out, or liquates, leaving the greater part of the impurities in the solid liquation residue.

In the field of crystallization in general, it is known that crystals often develop a dendritic (treelike) morphology, the trunk and arms of which are usually parallel to definite crystallographic directions. This form permits rapid crystal growth because the tips of the dendritic arms are always near parts of the medium which are relatively undepleted in the crystallizing component and unwarmed by the heat of crystallization. Crystal growth, specifically, is the enlargement of crystals at the expense of materials in contact with them and depends on the rate of diffusion of impurities and the rate of heat flow away from the growing crystal surfaces. It follows that the bounding planes of the crystals are perpendicular to the direction of slowest growth and parallel to planes of densest molecular packing. The more rapidly a crystal is grown and the less pure its growth environment, the greater the number and variety of imperfections it acquires, and tending toward formation of many small crystals, or crystallites (polycrystalline). Comparatively slow rates of formation are required to produce large single crystals free of crystallite grains.

A further reference on the subject of crystallization is the following publication in which I was named as a co-author:

"Dendritic Crystallization of Ice from Aqueous Solutions" by Pradeep K. Rohatgi, Surendar M. Jain and Clyde M. Adams, Jr., published in I & EC FUNDAMENTALS Vol. 7, Page 72, February 1968. (Copyright American Chemical Society.)

Notwithstanding prior knowledge of the above principles and finer theoretical aspects of the art (primarily in metallurgical and chemical applications), means for liquation separation which are substantially conservative of energy, and hence applicable to large scale operations such as heavy industrial water purification plants, have not been revealed heretofore in terms according to the present invention.

SUMMARY OF THE INVENTION

Treatment of mixtures to separate constituents utilizing principles of liquation, and more particularly such treatment of polluted water wherein crystallization and remelting take place in a quiescent, undisturbed state and at heat transfer rates sufficiently low to promote the formation of large dendritic crystal structures with spacing between the dendritic elements large enough to enhance removal of high concentration solute during slow reheating. In a preferred embodiment of the invention, in apparatus for treatment and separation of aqueous mixtures, a mixture is transported through a long heat transfer conduit or tunnel in containers under quiescent, undisturbed conditions, i.e., without agitation, as would be caused by pumping, stirring, liquid flow or inertia, and with a residence time of the order of many hours or possibly a few days, so that slow dendritic crystal growth and remelting take place. Trains of containers moving in one direction through a centrally located refrigeration zone in the conduit pass trains of containers moving in the opposite direction, whereby containers of liquid (uncrystallized) mixture entering at each end of the conduit are gradually cooled by loss of heat to cooler containers of melting dendritic crystals leaving the cooling zones.

DESCRIPTION OF THE PREFERRED EMBODIMENTS

Figure 1:
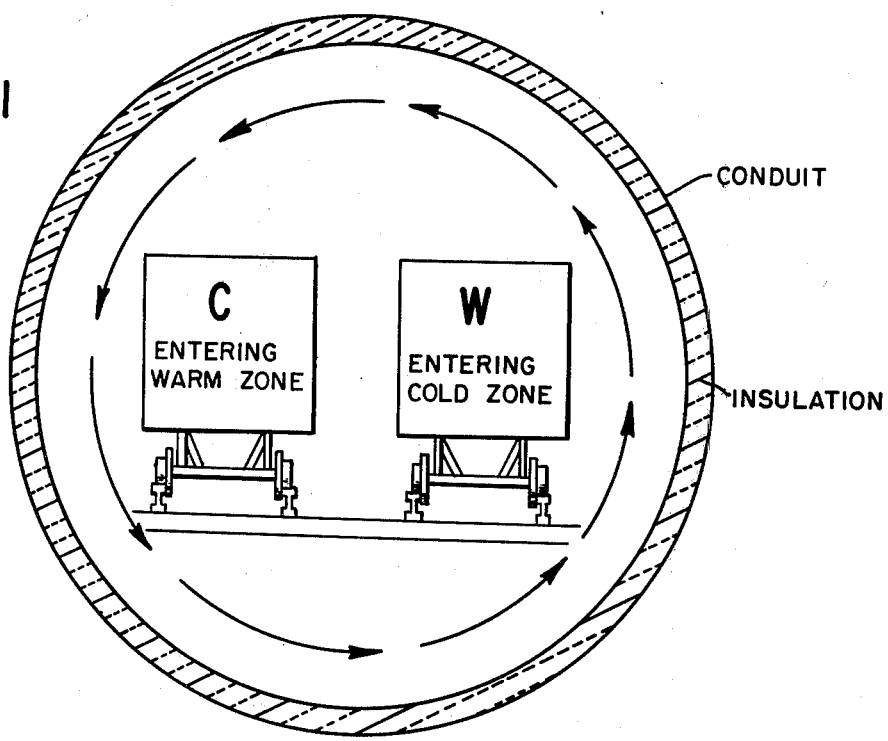
FIG. 1 is a vertical transverse cross-section of a heat transfer conduit through which a mixture to be separated is conveyed in accordance with this invention.

The principle of liquation is that some compositional separation usually occurs when a liquid solution is solidified (frozen) by cooling and then reheated to permit partial melting, provided the liquid produced upon melting is allowed to separate from the residual solid, typically through some mechanical arrangement which permits gravity drainage. The composition of the liquid is different from that of the residual solid, containing higher concentrations of those solutes which tend to lower the freezing temperature of the liquid. For example, upon liquation of frozen seawater (sea ice), the first liquid to separate contains a high concentration of dissolved salts, several times that of the original seawater. After some portion of the solid has melted (as little as 10 percent under ideal conditions) the residual solid contains very little salt. This solid can then be melted to produce water nearly free of salt, quite suitable for many "fresh" water applications. Further refinement can be realized by repeating the process and/or permitting a larger portion of the original solid to melt and be drained off as brine. Eskimos have long practiced the technique as a means for producing potable water. The same principle has been used to effect separations among lead, silver, tin, antimony and other metals.

It is a principle teaching of this invention to show apparatus which effects liquation separation with minimal expenditure of energy; indeed, a major distinction over earlier practices of liquation is this feature of energy conservation. In the example of separating fresh water from the sea, heat, transferred from cooling and solidifying seawater, is used to melt and raise the temperature of product water and brine, such that seawater continuously enters, while product water and brine continuously leave the apparatus, all at or near ambient temperature.

In the vast majority of liquid systems, the solute(s) has (have) some effect on the freezing temperature of the solvent. The usual effect is for the solute(s) to lower the freezing point; thus copper lowers the freezing temperature of aluminum, and sodium chloride lowers that of water. On the other hand, nickel raises the freezing temperature of liquid copper, and platinum that of liquid gold. As long as there is a freezing temperature effect, increase or decrease, the mixture will be susceptible of separation by liquation. For example, suppose the objective is to remove copper from an alloy containing 4 percent copper, balance aluminum, to produce relatively pure aluminum. Upon liquation, the residual solid will be the partially refined aluminum, after separation of a liquid containing about 30 percent copper. As a second example, consider the partial removal of a small amount of nickel from copper; in this case, since nickel *increases* the freezing temperature of copper, the nickel will tend to concentrate in the residual solid, and partially refined copper will be the separated liquid.

In both the examples above, removing copper from aluminum and nickel from copper, the phrase "partially refined" was used. It is characteristic of liquation, especially where, as in these examples, there is solid as well as liquid solubility, that absolute separation of constituents does not obtain. However, in most cases, repeated processing can bring about any desired degree of refinement.

Certain combinations present systematic limitations. In the example above, 4 percent copper, 96 percent aluminum, it would be possible, by multiple liquation, to produce aluminum of any desired purity, but pure copper could *not* be separated by this means. The highest copper concentration which could be realized is 33 percent, because this is the composition exhibiting a minimum freezing temperature (eutectic). Thus, from most mixtures, relatively pure solvent can be produced by liquation (or multiple liquation), but not always pure solute. In this sense, the term "solvent" is used to designate the major constituent of a mixture, in which relatively smaller concentrations of "solute(s)" is (are) dissolved, and these terms are most commonly used in connection with dilute solutions.

Some systems, notably those in which there is complete solid as well as liquid solubility, are susceptible of total separation by liquation, although this may not always be practical. In principle, for example, any alloy of copper and nickel could, by multiple liquation, be separated into substantially pure copper and substantially pure nickel.

For liquation to work, there must be some dependence of freezing temperature on composition. Thus nickel cannot be separated from cobalt by liquation, because neither has any appreciable effect on the freezing temperature of the other. For the same reason, the method cannot be appled to separation of different isotopes of a metal such as uranium, from one another.

The degree of separation realized in liquation is strongly influenced by the physical details of solidification and partial remelting. Specifically, in water treatment, freezing takes place by the edge-wise growth of plate-shaped ice crystals (platelets) uniformly spaced and parallel to each other and also parallel to the principal direction of heat flow. These crystals are composed of ice which is free of dissolved substances but may contain suspended solids. The dissolved substances concentrate in liquid between the plate-shaped crystals. As solidification proceeds, the thickness of the platelets increases, as does the concentration of dissolved substances in the inter-crystalline liquid, until the whole mass is substantially solid. At very low temperature, the inter-crystalline liquid may transform into a solid aggregate of ice and salts, but, generally, such low temperatures are neither necessary nor practical, and the phrase "substantially solid" embraces a condition in which there may remain some intercrystalline liquid.

Once the mass is substantially solid, the next step is to make some mechanical rearrangement, such as inverting the container, so that there may be partial physical separation, as by gravity drainage, of liquid from solid during partial melting, the signal feature of separation by liquation.

Partial melting is essentially the reverse of solidification, with the intercrystalline liquid regions growing in partially dissolving the ice platelets. The liquid then drains from between the platelets, carrying with it most of the dissolved substances.

The degree of separation realized in this vital drainage mechanism depends on several factors, including the spacing and orientation of the platelets, the direction of heat flow, and the rate of remelting.

Of these the most important is the spacing of the platelets; the larger the spacing (i.e., the greater the center-to-center distance between adjacent platelets), the more complete is the drainage, because there is less tendency for capillary retention of liquid. The spacing depends on the prior rate of solidification; slower freezing favors larger spacing. More specifically, the spacing has been found proportional to the square root of the solidification time. Thus slow freezing favors subsequent separation.

Slow melting, associated with small temperature differences within the mixture, also favors efficient separation, because there is less wasteful melting of solid crystals.

The morphology of crystals formed during solidification is generally an intrinsic property of the particular solution being processed. As has been noted, dilute aqueous solutions freeze by the formation of uniformly spaced, plate-shaped crystals, parallel to each other and to the principal direction of heat flow during solidification (i.e. to the principal growth direction). Most metallic solutions freeze by the growth of rod-shaped crystals, typically exhibiting side branches; these branched crystals are called dendrites. Most organic or other non-aqueous liquid solutions freeze by the formation of plate-shaped crystals often complicated by side branching. Whatever the specific morphology, the size and spacing of the crystals increases in proportion to the square root of the solidification time, so that slow freezing favors a coarse crystal structure, from which there can be freer drainage during liquation.

In summary, separation by liquation is favored by relatively low rates of heat transfer and of liquid-solid transformations throughout the freeze-thaw sequence.

Complete solidification is not always a necessary or even desirable step in effecting separation by liquation. Partial solidification is often practical and adequate, but must be followed by some melting and physical separation (as by gravity drainage) of liquid from solid. In some cases, complete solidification is quite impractical. For example, many waste waters contain dissolved ammonia; a water solution of ammonia would have to be cooled to extremely low temperature for complete solidification, but dilute ammonia water (ammonium hydroxide) is sufficiently solid at $-5°$ C. to enter the melting phase of separation by liquation. Similarly, seawater need only be cooled to about $-10°$ C. even though *complete* solidification of this complex solution only takes place at temperatures below $-40°$ C.

Although the method has principal utility in the separation of constitutents which are soluble in the liquid state, enhanced sedimentation (settling of suspended solids from the liquid may also be effected. Suspended solids have little effect on freezing temperatures, and so are not generally susceptible of removal by liquation, per se. However, after separation of soluble constituents by liquation, it has been found upon slow quiescent melting of the residual solid, there is pronounced agglomeration and settling of suspended solids, which can be separated from the refined liquid by decantation. In essence, the freeze-melt sequence, under nonturbulent conditions, enhances sedimentation.

Separation by liquation has application to mixtures which are either substantially liquid (Case I) or substantially solid (Case II) at ordinary ambient temperatures.

In Case I the mixture is first cooled to a partially or substantially solid state, then partially melted under mechanical circumstances which effect physical separation of most of the residual and remelted liquid from the residual solid by some means such as gravity drainage, centrifugation, vibration, mechanical pressure, or pneumatic pressure, and, finally, the residual solid is separately remelted, heated to near ambient temperature and separated from any sediment by some means such as decantation, filtration, or centrifugation, these steps being conducted such that the heat being evolved from those portions of the mixture which are cooling or freezing, is transferred to and used for melting and heating other portions comprised of partially or substantially solid mixture, residual solid, and separated liquid, such that all portions are caused to enter and leave the apparatus at or near ambient temperature, and minimal energy is expended in the slight net cooling of the substances passing through the apparatus.

In Case II the mixture is heated to bring about partial melting under mechanical circumstances which effect physical separation of most of the liquid from the residual solid, as in Case I and the residual solid and separated liquid are cooled (with probable solidification of the separated liquid, depending on its freezing temperature) to near ambient temperature, the heat evolved being used to increase the temperature of and partially melt the incoming mixture, such that all portions are caused to enter and leave the apparaturs at or near ambient temperature.

Alternatively, Case II can be operated to effect additional separate melting and resolidification of the residual solid, entirely within the apparatus, for some purpose such as consolidation, casting into convenient shapes, or sedimentation, the entire sequence remaining energy conservative through internal transfer of heat from those portions which are solidifying and cooling to those which are heating and melting.

The energy conservative method of separation by liquation has potential application to any circumstance where it is desired to process a mixture, which, when liquid, is a solution containing one or more constituents which have some effect on the freezing temperature of the solution, the objective of this processing being to separate or partially separate the mixture into its constituent species. Principal among the commercially or technically important applications are: (1) Separation of fresh water from seawater, brackish water, or polluted water. (2) Processing of liquid or liquifiable mixtures conventionally handled by distillation or evaporative fractionation. Such liquid or liquifiable mixtures must also be capable of complete or partial solidification. These include petroleum, petroleum derivatives, fermentation products, and various industrial liquids and plant and animal extracts. (3) Refinement of secondary metals, such as scrap aluminum. (4) Concentration of (by extraction of water from) liquid mixtures, where it is desired to remove water without removing volatile constituents, such as alcohol from a beverage or aromatic compounds from a perfume. Whereas processing by distillation or vacuum evaporation preferentially removes volatile constituents, separation by liquation can preferentially remove water. The method would also have application to the concentration of certain organic or sensitive solutions, including some medicines, which could be damaged by heat or vacuum. (5) Recovery of valuable constituents from dilute solutions. For example, the method offers a low energy means for producing concentrated brine from seawater or salt wells, and can facilitate low cost recovery of valuable minerals such as magnesium and bromine. (6) Development, production or processing of constant melting invariant mixtures.

These are just examples. There are many other applications. The essential criteria of applicability of the method are: (1) The objective is to effect partial or complete separation of the mixture. (2) The mixture must be liquid or liquifiable. (3) When in the liquid state, at least some of the constituents to be separated must be present in liquid solution. (4) At least some of the constituents in the liquid solution must be substances which have an effect, by their presence, on the freezing temperature of the liquid (i.e. substances, the changing of whose concentration would beget a concomitant change in the freezing temperature of the liquid). (5) The liquid must be solidifiable (i.e. practically suceptible of at least partial solidification).

The energy conservative apparatus for achieving the required heat transfers consists of a system of multiple conveyances, arranged in one or more pairs of trains, one train of each pair travelling in a direction opposite the other, through a long conduit, the ends of which are maintained at or near ambient temperature, with a central region maintained at a different temperature, such that the mixture passing through will be subjected to the necessary liquid-solid transformations required to effect separation by liquation. Within the conduit, mechanical means are provided to accomplish partial separation of liquid from solid during the essential partial melting phase of the liquation process.

Consider one adaptation of the method to the processing of a liquid mixture, such as waste water or seawater. Each conveyance consists of an upper invertible chamber and a lower chamber, the assembly constructed for rail transport through the conduit. As the conveyance enters one end of the conduit, the upper chamber is filled with liquid at ambient temperature. The conveyance proceeds through the conduit toward a central region maintained by refrigeration at low temperature, the water substantially freezes, and then the conveyance moves on toward the other end of the conduit, which is at ambient temperature. However, after the mixture has become substantially solid, the upper chamber is inverted; then, as the conveyance emerges from the central cold region, partial melting takes place, the liquid draining into the lower chamber, the residual solid retained in the upper chamber. After a prescribed quantity has melted, the upper chamber is rotated back to its original position. As the conveyance continues its journey, the residual solid in the upper chamber melts. The conveyance finally emerges from the conduit with liquid product in the upper chamber and liquid with concentrated dissolved contaminant in the lower chamber, both at or near ambient temperature.

In continuous operation, one conveyance follows another in a steady train through the conduit. Another identical train travels through in the opposite direction. The essential heat transfer is from one train to the other. An entering conveyance, approaching the cold region, is adjacent to and slightly warmer than another conveyance travelling from the cold region, and heat is transferred, primarily by convection, from the warmer to the colder conveyance. The velocities of the trains, equal but in opposite directions, are adjusted consistent with the overall rate of heat transfer, the total heat capacities of the conveyances, together with their contents, and allowing for latent heats of solidification and melting, to control the temperature difference between oppositely travelling conveyances, at any given station within the conduit, but particularly near the ends of the conduit, where, for reasons of energy conservation, it is desired to prevent the conveyances from exiting at a temperature too far below ambient. In fact the selection of an optimum velocity is predicated on a compromise between productivity and energy conservation. The higher the velocity of the trains, the greater the production, but also the greater the temperature difference and the energy consumed per thousand gallons of product.

It is convenient to effect heat transfer by air convection. If the oppositely travelling trains are positioned at the same level, on parallel tracks, as close to each other as practical, and enclosed by a conduit which may be of circular cross-section, with its centerline between the two trains, natural convection will be enhanced. Consider train "W", approaching, and train "C" emerging from the cold region. At any selected cross-section of the conduit, a conveyance in train "W" will be warmer than the adjacent conveyance in train "C". Air heated by train "W" will rise and air cooled by train "C" will flow downward, causing development of the transverse convective circular flow pattern shown in FIG. 1, effecting the required heat transfer.

Figure 2:
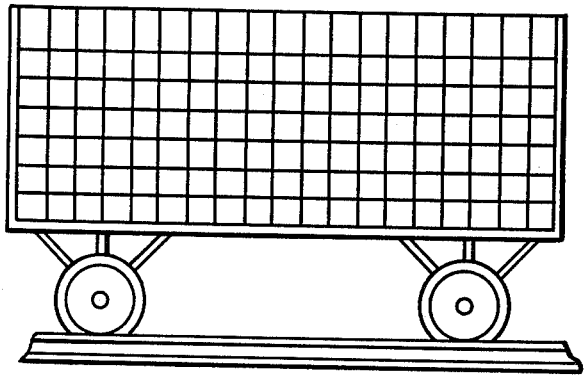
FIG. 2 is a side view of a typical type of container or tank in which a mixture is conveyed through the heat transfer conduit.

It may also be desirable to promote conductive heat transfer within the masses of liquid and solid being processed. This is particularly the case in large water treatment operations, where bodies of liquid and solid may be of large dimensions, and heat transfer, particularly during solidification, if limited by conduction through ice and water, would be intolerably slow. By providing a network or grid, as shown in FIG. 2, of metal strips, wires, sheets, tubes, bars, or other shapes, initially immersed in and extending throughout the mixture, heat conduction is greatly augmented, because the metal is a much better conductor of heat than either ice or water. The metal network can fulfill the additional function of retaining the residual solid in the upper chamber, when this chamber is inverted, during partial melting.

Figure 3:
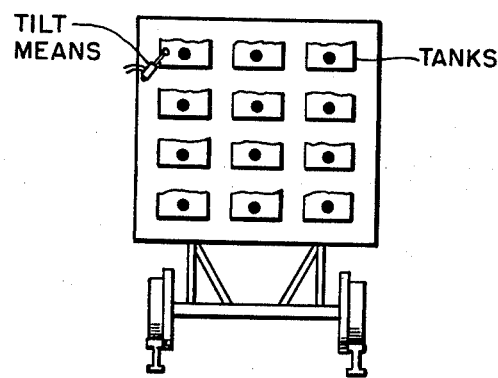
FIG. 3 is a vertical transverse sectional view of a container such as shown in FIG. 2.

Alternatively, the "upper chamber" may consist of a multiplicity of vessels, as shown in FIG. 3, which may be individually or collectively invertible; such a multiplicity of vessels, constituting in aggregate the upper chamber, offers greater susceptibility both to convective and conductive heat transfer than does a single large vessel. If these multiple vessels are individually small enough, conduction need not be augmented, as by a metal network, but, of course, some means, such as a grid, must be provided to retain the residual solid in each vessel during liquation, while the upper chamber is inverted.

In one practice of the invention, as applied to seawater, secondary metals, or other mixtures, the inversion of the upper chamber, to terminate liquid drainage during melting, can be automatically controlled by sensing the weight of residual solid. When a predetermined reduction in the weight of the residual solid has taken place, this reduction being accountable to liquid which has separated during liquation, the upper chamber is automatically inverted to prevent further drainage.

The fact that solidification and partial melting both take place in the same vessel (i.e. the upper chamber), under similar conditions of slow convective and conductive heat transfer, results in a crystal configuration generally favorable to liquid drainage during liquation. However, in some adaptations of the method, where it is desired to effect the most complete refinement or separation possible, it may be advantageous in insulate or partially insulate the vessel or vessels comprising the upper chamber. The purpose of this insulation is to bring about more nearly uni-directional heat flow in the vertical direction, and, consequently, an aggregation of crystals, formed during solidification, oriented nearly parallel to the single direction of heat flow (i.e. nearly vertical). This gives a circumstance ideal for liquation, but at a cost in reduced rate of overall heat transfer and hence reduced production capacity.

Figure 4:
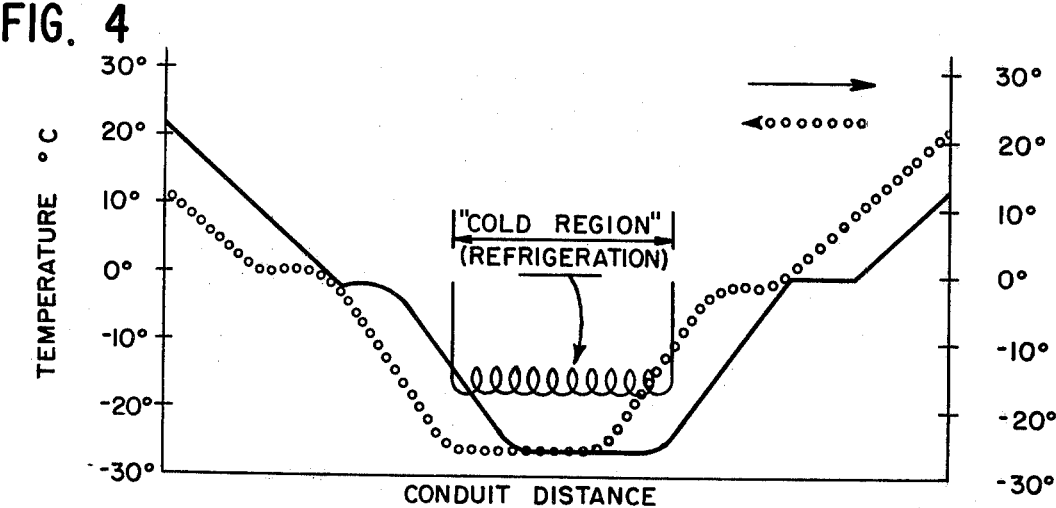
FIG. 4 is a temperature curve for the liquation of an aqueous mixture during its travel through the heat transfer conduit.

Refrigeration is supplied over a centrally located length of the conduit, and the temperatures along the conduit are established primarily by the internal heat transfers among the oppositely travelling trains and the walls of the conduit. The walls are insulated to prevent heat transfer from the warm ambient surroundings, and so minimize the energy required for refrigeration. The temperatures within the contents of the conveyances are distributed along the conduit as shown in FIG. 4. The temperature distribution in train "C" is the same as in train "W", but the two are displaced equal distances, but in opposite directions from the center of the cold region, in consequence of the temperature differences associated with the prevailing heat transfers. The greater the mutual (equal but opposite) velocities of the trains, the greater the displacement, the greater the temperature differences, and the greater the production rate, but the less complete is the separation (because of faster freezing and melting) and the greater the energy consumption (because products are discharged at lower temperature, thus involving more net refrigeration).

As an example, in a large industrial plant for processing approximately one million gallons per day gross capacity of brackish water and effluent from sour water strippers ("gross capacity" includes the partial recycle needed to achieve high concentration brine discard of minimum volume), the thermally insulated conduit will be about 600 feet long, with a centrally located cold region (FIG. 4) about 100 feet long. In practice the conduit itself can comprise a quonset type of structure of semi-circular cross-section, about 60 feet wide and 30 feet high. The volume of each individual tank or cart is not critical to the process, the parameters being governed rather by the gross capacity and residence time. For purposes of drainage of solute, each tank can be individually rotated up to 180° until residual ice is sufficiently free of contaminants for subsequent use or disposition, as indicated by automatic sensing of the weight or electrical conductivity of the drained liquid, whereupon the tanks are reinverted. The central cold region is maintained at or below −10° C. (14° F.). As melting continues to progress, drainage takes place until residual ice is clean enough to constitute "product." The first such separation produces a brine which is too dilute and hence too voluminous to discard; this brine is recycled, usually more then once, producing ever more concentrated brine (and more clean water) until some reasonable limit is reached (usually between 15 and 20% total dissolved solids if sodium chloride is dominant). In this example, if the ratio of brine to product water is relatively low, and the refrigeration system can reasonably be expected to operate between an ambient temperature of 22° F. and a cold region temperature of −10° C., with a coefficient of performance of 3.8 or better, the net cooling would consume about 12 kilowatt hours per 1000 gallons of water (gross).

Reference is variably made herein to a "tunnel-like" conduit. A conduit of the magnitude exemplified above in fact can comprise a tunnel in the true sense. For example, an otherwise unusable tunnel or mine shaft in the earth can be cheaply and beneficially utilized for this purpose. A significant attraction of such installations is that it takes advantage of the inherent insulation and substantially constant temperature provided by a heat sink in the surrounding earth.

It should be understood that the conduit need not be straight (linear), but may be curved (e.g., circular, oval, or U-shaped). Also the convective heat transfer between incoming and outgoing containers of mixture can be accomplished either by using two separate trains of containers as illustrated, or by looping a return leg of a single train back upon itself after passing through the cooling region.

Were it not for latent heat effects, the temperature distributions in FIG. 4 would be smooth and almost linear. However, as the mixture enters the conduit, the liquid cools in a continuous fashion, until there is a thermal arrest when freezing begins, due to evolution of the latent heat of solidification; there is a similar discontinuity associated with melting as the material emerges from the cold region. The temperature distributions are not perfectly symmetrical. During freezing, the growing ice crystals are in continuous contact with intercrystalline brine; however, the process of liquation extracts the salt water from contact with the ice crystals, and the melting of the residual solid therefore requires a slightly higher temperature than prevailed during any stage of the prior solidification process. In other words absenting the salt has the effect of raising the melting temperature of the residual ice. FIG. 4 reflects a reasonable temperature distribution for processing typical seawater, at an initial ambient temperature of 22° C. Upon cooling, solidification begins just below −2° C. and proceeds approximately in accordance with the following table:

| Temperature (°C.) | Fraction Solid |
|---|---|
| −2.08 | 0 |
| −3 | 0.30 |
| −4 | 0.47 |
| −6 | 0.65 |
| −10 | 0.78 |
| −20 | 0.89 |
| −26 | 0.91 |

Much of the freezing, and the associated release of latent heat, takes place within the first few degrees of cooling; the material becomes 65% solid in cooling from −2° C. down to −6° C., and is 91% solid at −26° C. At this stage, those solids which were originally in the dissolved state in the seawater, reside almost exclusively in the liquid between the solid platelets, either still dissolved in what is now a concentrated brine, or as solid crystals of various salts which have precipitated during solidification. Also associated with this intercrystalline liquid are gases which were originally dissolved in the seawater; if the gases are highly soluble, such as ammonia or carbon dioxide, they may still be present in the dissolved state, but less soluble gases, such as nitrogen and oxygen tend to separate as bubbles in the liquid regions.

At the low temperature of −26° C., this mixture, now 91% solid, is structurally coherent, substantially solid, and can be inverted without any immediate separation of entrained liquid. Then, as the conveyance proceeds towards a warmer region of the conduit, melting and gravitational separation of the liquid rich in dissolved contaminants, takes place. After there has been sufficient melting to effect the desired degree of separation by liquation, the upper chamber is re-inverted to its original position. Finally, the conveyance emerges from the conduit with product water in the upper chamber and relatively concentrated brine in the lower chamber, both slightly below ambient temperature.

Energy conservation is enhanced as the length of the conduit is increased, primarily because there is thus provided greater opportunity for the necessary internal heat transfers. Increasing the length also reduces energy losses associated with convective escape of relatively cold air from the ends of the conduit; further conservation can be realized by providing internal baffles to impede excessive air flow along the length of the conduit. In addition, the conduit can be designed such that the travel path slopes upward in both directions from the central cold region, thus favoring stratification of the heavier colder air in the lower colder regions of the conduit. Then the trains would travel slightly downhill toward and slightly uphill away from the central cold region.

Freeze desalination has long been known, the various types of plants are in operation throughout the world. All these processes depend upon the fact that, with very few exceptions, materials soluble in water have no solid solubility in ice. Therefore, solidification of seawater results in a mechanical mixture containing solid plate-shaped crystals of ice, a form of pure water, together with either liquid brine or solid crystals of various salts, or both. These processes have always been attractive because (1) internal energy transfers are less than in distillation processes, since the latent heat of solidification is considerably less than that of vaporization, (2) the low temperature of operation largely circumscribes problems with corrosion or maintenance of working materials, problems which plaque all high temperature processes, and (3) the lower the theoretical energy required to effect separation. The single big problem with freeze desalination has been the difficulty of separating product (ice) from intercrystalline brine and salt crystals, a problem greatly aggravated by the plate-shaped habit of the ice crystals. In most freeze desalination processes, from 20 to 40 percent of the product water must be recycled to wash the ice crystals, and the apparatus for accomplishing this may be quite elaborate. Controlled solidification, together with liquation, effects separation through the simplest of all agencies: gravity drainage, while retaining the other advantages inherent to freeze desalination processes. Furthermore, the arrangement of countercurrent conveyances in a conduit makes the liquation process disclosed herein much more energy conservative than other freeze desalination arrangements.

In general comparison with all other desalination processes, the apparatus for the liquation method herein disclosed tends to be much more massive and simple, employing low cost materials of construction, such as reinforced concrete, cast iron, galvanized steel, and aluminum. The liquation method also requires little in the way of sophisticated instrumentation and controls or other auxiliary apparatus. Evaporative methods, such as flash evaporation, vapor compression, or multiple effect distillation, require very large heat exchangers, composed of corrosion resistant materials such as cupronickel tubing, and extensive water pretreatments such as deaeration, corrosion inhibition, and filtration or sedimentation. In other words, the effect of exchanging the liquation method for any of the conventional processes is to replace complexity with size. The liquation apparatus must be physically large to generate appreciable production; this comes about because the specific rates of heat transfer in the liquation apparatus, expressed in units such as kilowatt/square meter, are much lower than those which characterize a typical heat exchange machine of the type used in evaporative and freeze desalination processes. The liquation method actually operates best at low rates of specific heat transfer, because these are associated with small temperature differences between countercurrent conveyances, and with low rates of solidification and melting, all contributory to efficiency. Moreover, the implementation of the liquation process can afford low rates of specific heat transfer, because low cost heat transfer surfaces are involved. This is certainly not the case for any process which involves heat transfer surfaces composed of materials like cupronickel tubing.

In summary, as applied to water purification, the method and apparatus for liquation separation herein disclosed accords lower energy cost per thousand gallons of product water, lower capital costs per unit production capacity, and lower maintenance and operating costs than offered by other methods.

In processing materials which are normally solid at ordinary ambient temperature, as in refining or separating scrap metals, trains of conveyances travel in opposite directions through a long insulated conduit, a central region of which is maintained at elevated temperature. Each conveyance consists of an upper and a lower chamber, and, during liquation, liquid drains from the upper to the lower chamber. Complete melting of the residual solid may not be required, in which case there is no need for the upper chamber to be invertible, but this chamber must be capable of retaining the residual solid while the liquid drains through holes or a grid provided for that purpose in the bottom of the chamber. Additional manipulations, and apparatus are required if complete melting of the residual solid is desired after liquation. For example the upper chamber can be invertible and provided with retaining grid at the top; the upper chamber is then inverted for liquation and reinverted for melting any residual solid. Further internal mechanical apparatus may be provided as part of the conveyance for casting the melted material into convenient shapes.

In adaptation of the method to refining metals, separation is enhanced if the material is first passed through the conduit solely to achieve complete melting and slow, directional solidification, without inverting the upper chamber, and hence, without liquation. The second time through, liquation is effected, the metal having been conditioned for more effective liquation by prior slow directional solidification. Although, using the invertible chamber practice, there must be provided means for retaining the residual solid, such as a grid, there need not be any auxiliary augmentation of heat conduction in processing metals, because these materials are characteristically good conductors of heat.

Figure 5:
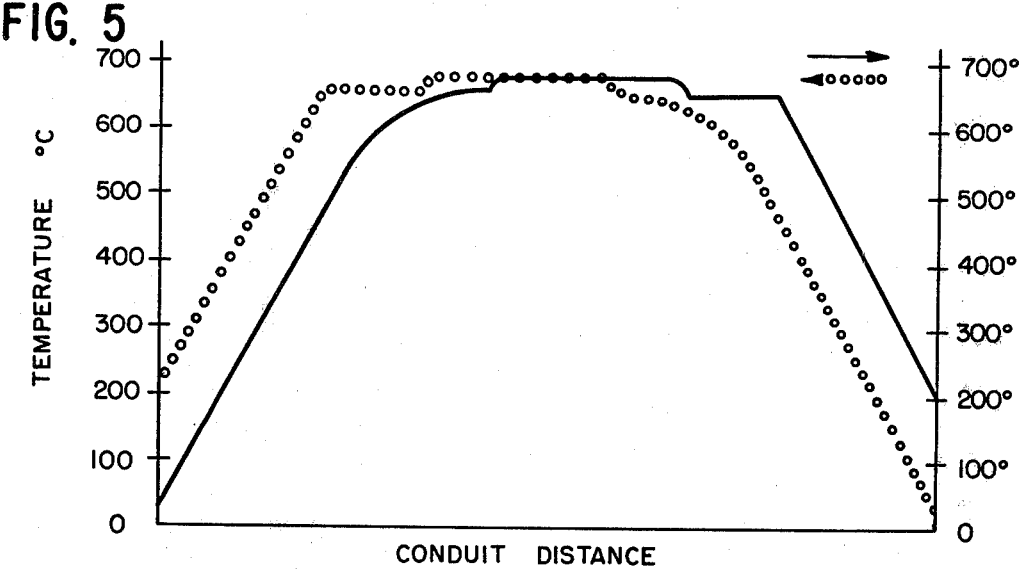
FIGS. 5 and 6 are temperature curves for the liquation of materials which are normally solid at ordinary ambient temperatures.
Figure 6:
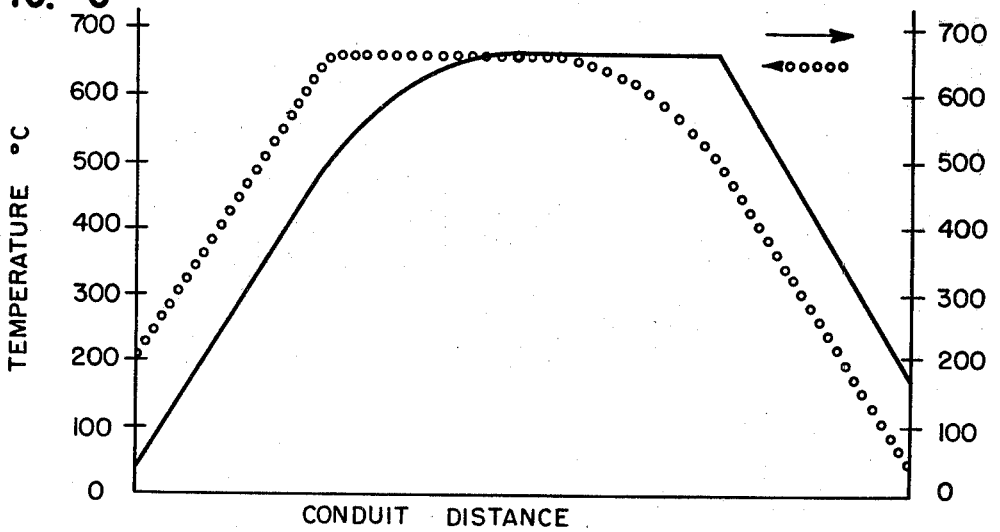

In processing a material which is solid at ordinary ambient temperature, the temperature in the material at various locations along the conduit is shown in FIG. 5. In this example, the refinement of scrap aluminum, the system is operated to bring about complete melting after liquation separation. If the original solid is in a condition which lends itself to separation by liquation (e.g. has been slowly and directionally solidified), the solid will enter the conduit with the upper chamber positioned to permit drainage of liquid. After melting begins, a certain pre-determined quantity of liquid is allowed to drain from the upper chamber, whereupon the upper chamber is inverted and the residual solid is completely melted. What had been residual solid, now liquid, proceeds to re-solidify as it travels from the hot central region of the conduit towards the exit. Substantially this same temperature distribution would prevail for pre-conditioning the solid by slow directional solidification; if preconditioning is the objective, the upper chamber enters the conduit so positioned as to contain all liquid, and retains that position throughout its journey through the conduit, such that melting and resolidification take place entirely in situ. Preconditioning is performed to improve the efficacy of separation during subsequent liquation. If neither preconditioning nor complete melting for any other reason (consolidation or casting into convenient shapes) are required, the distribution of temperature within the material along the conduit is shown in FIG. 6; in this type of operation, the upper chamber is fixed in the position to permit drainage of liquid, and remains in that position throughout its journey through the conduit. (Just enough heat is supplied for partial melting.) Thus there are three types of operation of the apparatus: (1) liquation with complete melting of the residual solid, possibly including a casting operation within the hot region, (2) liquation without complete melting, and (3) preconditioning for liquation by melting and slow directional solidification. Only the first of these three types of operation, liquation together with complete melting of the residual solid, requires inversion of the upper chamber during its transit through the conduit.

To promote energy conservation, the conduit can so be arranged that the conduit slopes upward toward and downward from the central hot region, thus favoring retention of hotter, lighter air in the upper, warmer portions of the conduit, and so inhibiting convective losses.

Conventional practices for the refinement of secondary metals have been characterized by gross waste of fuels such as natural gas and oil, and pronounced tendency to pollute the atmosphere. The energy waste and pollution problems are related. Since the refining systems have not been designed for energy conservation, fuel must be used in great quantities; as a consequence, large volumes of products of combustion are produced and discharged from the operation carrying objectional quantities of particulate and gaseous pollutants. It has not been economically feasible to use electrical heating means (induction, arc or resistance), because, essentially non-polluting, electrical energy, used simply as heat, is much more expensive than that derived from combustion of hydrocarbon fuels. However, using the energy conservation method of separation by liquation, disclosed herein, there obtains not only a more efficient and superior degree of refinement, but electrical heating is rendered economically attractive. In fact, using the liquation method, the overall saving in total energy much more than offsets the higher cost per unit of energy generally associated with electrical heating; a substantial side benefit is the elimination of atmospheric pollution.

In still another practice of the method, the lower chamber may consist of a multiplicity of vessels so arranged that each receives drainage liquid from the melting solid only at a particular temperature zone within the conduit. An example is the fractionation of partially refined petroleum or a mixture of petroleum derivatives. Because of the very low solidification temperatures, the central cold region of the conduit must operate at cryogenic temperatures, which may be $-150°$ C. or below. Then, for example, during liquation of a mixture consisting mainly of saturated hydrocarbons, depending on the overall composition of the mixture, that liquid which drains from the solid in the temperature range $-130°$ C. to $140°$ C. may consist largely of butane and pentane, that between $-90°$ C. and $-100°$ C., hexane and heptane, that between $-50°$ C. and $-60°$ C., octane and nonane, and the higher molecular weight hydrocarbons at ever increasing temperatures. Most of the mixture having a molecular weight above that of hexadecane ($C_{16}H_{34}$) emerges from the system as residual solid. This solid can then be processed in a separate system having a central hot region rather than a central cold region, again with the lower chamber consisting of a multiplicity of vessels, each arranged to receive drainage liquid exclusively within a predetermined temperature range, thus effecting fractionation into various of the higher melting hydrocarbons such as the paraffins and asphalts.

In processing mixtures of organic substances, or other nonmetallic mixtures, including water, which characteristically exhibit relatively low heat conductivities, it may be necessary to provide a metal network, such as that shown in FIG. 2, to facilitate conductive heat transfer within and through the mixture.

In one arrangement for fractionation, the lower chamber consists of a single vessel divided into compartments. Each compartment is covered to prevent ingress of liquid except when it is passing through a specified zone in the conduit during liquation; there is a different zone for each compartment; thus the different compartments receive different fractions of the liquid. Each or any fraction can be further refined by repeated liquation.

Low melting invariant compositions pose special problems and opportunities in liquation.

In freezing or melting, a low melting invariant mixture can be defined as one which exhibits two main characteristics:

(1) The entire liquid-solid transformation takes place at a fixed temperature. (2) During solidification, the liquid and solid have the same overall chemical composition.

For example, upon slow cooling, a water solution containing 23.3 percent sodium chloride (salt) freezes completely at $-21°$ C.; at $-20°$ C., the solution is entirely liquid; at $-22°$ C. it has transformed into a totally solid mechanical mixture of ice and salt crystals. During solidification, at −21° C., the solid mixture which has already formed, and the remaining liquid, each contain 23.3 percent salt.

Most but not all low melting invariants form a mechanical mixture upon solidification; those that do, like 23.3 percent salt in water, are called eutectic mixtures. However, some invariant compositions, such as 76 percent gold, 24 percent copper, freeze as homogeneous single phase solid solutions.

A low melting invariant can be produced by liquation but cannot be further separated. Thus, a dilute solution of NaCl in water can ultimately be separated, by multiple liquation, into two portions (1), pure water and (2) a solution containing 23.3 percent salt, but this is the limit. Starting with the 23.3 solution, no separation at all can be achieved by liquation. Another example, already mentioned, is the impossibility of separating, by liquation, pure copper from an alloy of 96 percent aluminum, 4 percent copper, because of an interfering low melting invariant containing 33 percent copper. Thus, the existence of these low melting invariants can pose an obstacle to separation by liquation, just as azeotropic behavior (constant boiling mixtures, such as ethyl alcohol and water or ethanol and acetone) can limit separation by distillation.

However, in certain specialized applications, liquation can be used to advantage in the preparation of low melting invariant compositions, even when the exact chemical analyses of these compositions are not known with exactness.

Low melting alloys have long been known and have many applications, including (1) solders and brazing alloys, (2) fusable anchors or chucks for holding tools or machine parts, (3) fusable plugs for safety and fire alarm devices, (4) fusable cores, molds and patterns for forming other materials, and (5) fusable filler for bending tubes or similar shapes without buckling. These alloys are based primarily on mixtures of bismuth, lead, tin and cadmium; some early versions were called Lipowitz metal, Woods metal, and Rose metal, and there are now over a dozen commercial compositions. Some of these alloys also contain indium, zinc, silver or antimony, melt at temperatures as low as 47° C. (117° F.), and contain as many as five components. These specific compositions were established over a period of several decades by trial and error, and most of them are polycomponent eutectics.

The liquation method affords a means by which very close compositional control of low melting invariant alloy composition can be achieved. The principle application to low melting alloys is in the adjustment or control of composition in original manufacturing or recycle operations. Furthermore, the method lends itself to the control, production and even discovery of complex invariant mixtures involving many more than five components. Not only would it be extremely laborious, by conventional thermal analysis methods, to discover the exact minimum melting composition of a ten component system, but having discovered it, production control, without some self-correcting technique such as liquation, would be difficult. The liquation method can advance and extend the field of low melting alloy development and manufacture.

Other applications for low melting invariant mixtures, nonmetallic as well as metallic, include constant temperature baths for heat transfer or temperature control applications. There are also applications in the development and manufacture of fluxes, slags and molten salt mixtures for welding, melting, heat treatment, and other metal processing operations.

As applied to the manufacture of low melting invariant compositions, not only is the liquation method disclosed herein energy conservative, but the slow directional solidification and remelting effects thorough drainage of the low melting composition during liquation.

In the manufacture of low melting alloys, the material to be processed is normally solid at ambient temperature. Treatment therefore takes place in a conduit with a central hot region; in general, it is advantageous to implement preconditioning by slow, complete directional solidification prior to the remelting involved in actual liquation.

Of course if the invariant composition is one that melts below ambient temperature, then processing is conducted by passage through a conduit with a central cold region.

In the implementation of liquation for the production of low melting invariants, the product emerges from the conduit in the lower chamber, and the residual material in the upper chamber is either discarded or recycled. The effect of the liquation method in this application is to remove or reduce the concentration of those undesirable constituents which have the combined effects of raising the freezing temperature and causing freezing to take place over a range of temperatures. Multiple liquation is frequently required to produce nearly perfect invariant low melting compositions.

Some systems also exhibit high melting invariant compositions. Typical are intermediate phases which occur in many metallic and ceramic systems, and behave during liquation as pure substances having a high melting point. Calcium-magesium and aluminum-nickel intermetallic compounds are examples. These high melting phases can be prepared by liquation, and can also constitute a barrier to liquation. When the liquation method disclosed herein is used to prepare a high melting invariant composition, the product is the residual solid in the upper chamber after lower melting material has drained off during liquation.

As one final example of invariant behavior, consider an alloy containing 11 percent aluminum, 89 percent copper. Upon repeated processing by liquation, this alloy could ultimately be separated into two invariant compositions, a high melting intermetallic phase, containing 13.4 percent aluminum and a low melting eutectic containing 8.5 percent aluminum.

These examples, water purification, refinement of secondary metals, fractionation, and production of invariant melting compositions, serve to illustrate specific adaptations of the energy conservative method of separation by liquation. Other applications, serving other needs, will become readily apparent to those knowledgable in the physical chemistry of the pertinent systems, and otherwise skilled in the art.

The method offers unique advantages over other techniques for separating soluble or partially soluble mixtures, for the purposes of refining, extracting, and/or concentrating constituents of said mixtures.

A particular advantage of the method is the effecting of separation with a minimum expenditure of energy, approaching more closely than was heretofore practicable, in any separation scheme, that theoretical, calculable minimum energy required for the separation or partial separation of solutions into constituent species.

Energy conservation is a signal feature of this invention. In processing seawater to remove dissolved solids, the method can be operated with consumption of less than 20 kilowatt-hours per thousand gallons. Evaporative, freeze-desalination, membrane and ion exchange processes typically require from fifty to several hundred kilowatt-hours per thousand gallons.

Another advantage of the method is that, depending as it does on liquid-solid transformations, the operating temperatures and internal energy transfers are lower than in processes such as distillation which depend on liquid-vapor transformation. In consequence, theoretical minimum and actual net energy consumptions are also lower and output capacities higher. Furthermore, in some applications, notably water treatment, the lower temperature begets a profound reduction in the tendency for or rate of corrosion and a concomitant reduction in the initial cost or need for maintenance of materials of construction. Moreover, processing at low temperature favors retention and capture of volatile constituents as concentrates in the drained liquid: thus is treating waste water, compounds such as ammonia and hydrogen sulphide may be kept dissolved, facilitating their later recovery, and minimizing undesirable odors and air pollution.

Another advantage of the method is the simplicity, low cost, and easy maintenance of the machinery for its implementation. Expensive materials, configurations, instrumentation, and skilled manpower are not involved. In this sense, as well as that of energy conservation the method constitutes a distinct advance over evaporative schemes, such as distillation, in the processing of many mixtures of commercial or industrial importance.

Another advantage of the method is that separation can be made more complete than with other, cruder adaptations of liquation, primarily because slow directional solidification and the associated crystal configuration facilitates drainage of liquid from residual solid.

Another advantage of the method is the capacity to reduce the concentration of any and all pollutants from some liquids, notably water, separately or collectively, to a specified level, whether those pollutants are dissolved or in suspension. This characteristic is especially valuable in the processing of highly complex, multicomponent solutions, such as waste water or seawater, where the usual objective is nondiscriminatorily to remove everything (i.e. increase the concentration of water).

The operation of the liquation apparatus can advantageously be "tuned" to the prevailing need. In treating waste water or seawater, for example, the process is adjusted to give just the quality of product water consistent with the intended application or disposition, thus making it possible to increase throughput or decrease energy utilization by producing water which is dilute but not "pure". Many agricultural or industrial water requirements can be met with water which has only been partially refined, while product water for human consumption must be quite pure, and that for a nuclear boiler still purer.

The method can be used advantageously to supplement or complement conventional separation processes, as, for example, when it is desired to facilitate capture of volatile constituents in the liquid state by low temperature operation, or when azeotropic behavior limits evaporative methods as is the case with alcohol and water.

What is claimed is:

1. A process for separation of a substantially liquid mixture containing solvent and dissolved and/or undissolved foreign matter comprising the steps of:
    cooling separate mixtures by moving them in opposite directions through a substantially closed environment at a controlled and very slow rate of freezing sufficient to produce large plate-like crystals of substantially pure solvent, with counter-flow heat transfer being effected, respectively, between relatively warmer and cooler mixtures passing in opposite directions;
    said cooling step being effected with the original mixtures constantly maintained in a substantially quiescent, undisturbed state;
    raising the temperature of the combination of crystals and intercrystalline matter rich in solute, resulting from said cooling of each mixture, at a controlled and very low rate of heat absorption said mixture being conveyed in containers past stationary zones in said closed environment wherein said cooling and heating steps take place;
    effecting removal of liquid rich in solute from spaces between said crystals during said step of raising temperature; and
    recovering the relatively pure solvent produced by continued heating and melting of said liquid crystals.

2. Apparatus for separating a mixture containing water and dissolved and/or undissolved foreign matter, comprising:
    means providing a long, tunnel-like conduit having ingress and egress openings at its ends;
    refrigeration means at an intermediate zone within said conduit;
    first conveyor means for introducing and carrying containers of a mixture through said conduit;
    second conveyor means carrying containers of a similar mixture through said conduit in heat exchange relation to the first-mentioned conveyor means and travelling in the opposite direction thereto;
    the containers carried by said second conveyor means, supplemented by the refrigeration concentrated at said intermediate zone, serving as means gradually cooling the mixture in containers carried by the first-mentioned conveyor means in a quiescent and undisturbed state while the same is conveyed in said containers from said ingress opening toward said intermediate cooling zone within said conduit;
    means stationed beyond said intermediate zone in the direction of travel of each said conveyor means for effecting removal of concentrated liquid rich in solute from spaces between solidified crystals of aqueous solvent; and
    means for recovering the relatively pure liquid resulting from continued melting of said crystals;
    said tunnel-like conduit extending beyond said intermediate zone in each direction of travel of said conveyor means for a distance sufficient to cause melting of said crystals at a slow rate in a closed, controlled environment.

3. Apparatus according to claim 2, wherein the containers carried by said second conveyor means further serve as means for gradually heating the mixture in containers being carried away from said intermediate zone by said first-mentioned conveyor means.

4. Apparatus according to claim 2, wherein at each side of said intermediate zone containers of mixture carried by said first and second conveyor means moving toward and away from said intermediate zone in counter-flow heat transfer relation collectively act as means to effect, respectively, the gradual cooling of the mixture entering the intermediate zone, and gradual heating of the mixture leaving the intermediate zone, said conveyor means being constructed to carry the mixtures in a quiescent and undisturbed state while the same are conveyed in said containers from said ingress opening toward said intermediate zone.

* * * * *